(12) United States Patent
Kim et al.

(10) Patent No.: US 8,941,291 B2
(45) Date of Patent: Jan. 27, 2015

(54) PLASMA ACTUATOR

(75) Inventors: Yoonho Kim, Shiga (JP); Takeshi Serizawa, Shiga (JP); Akira Nakajima, Shiga (JP)

(73) Assignee: Daihatsu Motor Co., Ltd., Osaka (JP)

( * ) Notice: Subject to any disclaimer, the term of this patent is extended or adjusted under 35 U.S.C. 154(b) by 249 days.

(21) Appl. No.: 13/391,848

(22) PCT Filed: Aug. 23, 2010

(86) PCT No.: PCT/JP2010/064137
§ 371 (c)(1),
(2), (4) Date: Feb. 23, 2012

(87) PCT Pub. No.: WO2011/024736
PCT Pub. Date: Mar. 3, 2011

(65) Prior Publication Data
US 2012/0152198 A1 Jun. 21, 2012

(30) Foreign Application Priority Data

Aug. 26, 2009 (JP) .................................. 2009-196044
Jan. 7, 2010 (JP) .................................. 2010-002356

(51) Int. Cl.
*B64C 21/00* (2006.01)
(52) U.S. Cl.
USPC ...................................... 313/231.31; 123/536
(58) Field of Classification Search
USPC ............... 315/231.31; 123/536–539; 244/205
See application file for complete search history.

(56) References Cited

U.S. PATENT DOCUMENTS

| 8,016,246 | B2 | 9/2011 | Schwimley et al. |
| 8,016,247 | B2 | 9/2011 | Schwimley et al. |
| 8,251,318 | B2 * | 8/2012 | Khozikov et al. ............. 244/205 |
| 2007/0241229 | A1 | 10/2007 | Silkey et al. |
| 2009/0212164 | A1 | 8/2009 | Osborne et al. |
| 2010/0224733 | A1 | 9/2010 | Wood et al. |
| 2011/0031886 | A1 * | 2/2011 | Ikeda ....................... 315/111.21 |

FOREIGN PATENT DOCUMENTS

| JP | 9186135 A | 7/1997 |
| JP | 2001342269 A | 12/2001 |
| JP | 2004249260 A | 9/2004 |
| JP | 2004353012 A | 12/2004 |

(Continued)

OTHER PUBLICATIONS

International Search Report and Written opinion of PCT/JP2010/064137 dated Nov. 9, 2010.

*Primary Examiner* — M. McMahon
(74) *Attorney, Agent, or Firm* — Banner & Witcoff, Ltd.

(57) ABSTRACT

A plasma actuator (1) includes four electrodes (11) and three dielectrics (10) and is disposed on the side of an object surface (B). When a high voltage is applied to the electrodes (11), a plasma (15) is generated at an end (10a) of each dielectric (10) exposed so as to be accessible to a gas. In the plasma actuator (1), the electrodes (11) and dielectrics (10) are alternately stacked one on another. The plasma actuator (1) includes a stepped exposed portion (X). The plasma actuator (1) in which the electrodes (11) and dielectrics (10) are arranged such that the ends (10a) of the dielectrics (10) are exposed in the normal line direction of the object surface (B) in the stacked order in the stepped exposed portion (X) can suppress the flow of the generated plasma even when the plasma actuator is exposed to a high-speed airflow under high pressure. This stabilizes the plasma.

6 Claims, 12 Drawing Sheets

(56) References Cited

FOREIGN PATENT DOCUMENTS

| | | |
|---|---|---|
| JP | 2006210178 A | 8/2006 |
| JP | 2007305336 A | 11/2007 |
| JP | 2008270110 A | 11/2008 |
| JP | 2008290709 A | 12/2008 |
| JP | 2008290710 A | 12/2008 |
| JP | 2008290711 A | 12/2008 |
| JP | 2009511360 A | 3/2009 |
| JP | 2009533276 A | 9/2009 |
| JP | 2009545487 A | 12/2009 |
| WO | 2007123612 A1 | 11/2007 |
| WO | 2007133239 A2 | 11/2007 |
| WO | 2008016928 A1 | 2/2008 |

\* cited by examiner

PLASMA ACTUATOR

RELATED APPLICATIONS

The present application is a National Phase of International Application Number PCT/JP2010/064137, filed Aug. 23, 2010, and claims priority from, Japanese Application Number 2009-196044, filed Aug. 26, 2009 and Japanese Application Number 2010-002356, filed Jan. 7, 2010.

TECHNICAL FIELD

The present invention relates to a plasma actuator, and more particularly to a plasma actuator capable of reducing an effect of an induced airflow on a plasma.

BACKGROUND ART

In recent years, a fluid control that utilizes a plasma actuator using dielectric barrier discharge has been vigorously studied. In the plasma actuator, for example, electrodes are arranged to sandwich a dielectric made of resin, ceramic, or the like. When an alternating voltage or a pulse voltage is applied between the electrodes, a plasma is generated in the vicinity of the electrode on the front side of the dielectric.

The plasma actuator thus configured is mounted on a wing of a gas turbine to suppress separation of an airflow from the wing surface, as disclosed in Patent Document 1, for example. Similarly, Patent Document 2 discloses a plasma actuator used to suppress separation of an airflow. Additionally, a plasma actuator disposed on a Coanda surface of a wing of an aircraft as disclosed in Patent Document 3 is known as a plasma actuator used to control separation of an airflow.

Patent Document 1: JP-A-2008-270110
Patent Document 2: JP-T-2009-511360
Patent Document 3: JP-A-2008-290710

DISCLOSURE OF THE INVENTION

Problems to be Solved by the Invention

Incidentally, each of the plasma actuators described above is exposed to a high-speed airflow under high pressure. Accordingly, a generated plasma may be pulled and flowed by such an airflow. As a result, the plasma becomes unstable, which may make it difficult to control the airflow.

Therefore, it is an object of the present invention to overcome such a defect.

Solutions to the Problems

A plasma actuator according to a first aspect of the present invention includes: a dielectric disposed on a surface of an object; a front surface electrode disposed on a surface of the dielectric so as to be accessible to a gas; and a back surface electrode disposed on a back surface of the dielectric so as to be arranged in a back-to-back manner with respect to the front surface electrode, the plasma actuator generating a plasma on a side of the front surface electrode by applying one of a high alternating voltage and a pulse voltage between the front surface electrode and the back surface electrode, wherein each of the front surface electrode and the back surface electrode is formed of a magnetic substance for applying a magnetic field to the plasma.

According to this configuration, the front surface electrode and the back surface electrode, each of which is formed of a magnetic substance, form a magnetic field. This magnetic field can suppress movement of the plasma, which is generated by applying the high alternating voltage or the pulse voltage, from the location where the plasma is generated to another location. This enables control of the flow of a gas even in the high-speed airflow under high pressure.

Examples of the magnetic substance forming the front surface electrode and the back surface electrode include an electromagnet.

A plasma actuator according to a second aspect of the present invention includes: at least three electrodes; and at least two dielectrics, the plasma actuator being disposed on a surface of an object to generate a plasma at an end of each of the dielectrics exposed so as to be accessible to a gas, by application of a high voltage to each of the electrodes, wherein the electrodes and the dielectrics are alternately stacked one on another, and the electrodes and the dielectric are disposed such that ends of the dielectrics are exposed in a normal line direction of the object surface in a stacked order.

According to this configuration, plasmas are generated at multiple stages when the high alternating voltage or the pulse voltage is applied. Accordingly, shock waves associated with the generation of the plasma are also generated at multiple stages. As a result, shock waves generated at multiple stages are connected to each other. This makes it possible to generate stronger shock waves. Consequently, the effectiveness for a dynamic pressure flow is increased. Therefore, the flow of a gas can be controlled even when the plasma actuator is exposed to a high-speed airflow under high pressure.

As a preferable configuration example for controlling the flow of a gas more reliably, a configuration may be employed in which the ends of the electrodes and the ends of the dielectrics are exposed in the normal line direction of the object surface in the stacked order, and a dimension of a portion of each end of the dielectrics, the portion being exposed from each of the electrodes, is set to be greater than a dimension of a portion of each end of the electrodes, the latter portion being exposed from each of the dielectrics.

In the plasma actuator according to the first or second aspect of the present invention, examples of the high voltage to be applied to the electrodes include a known voltage capable of generating a plasma, such as a high alternating voltage or a pulse voltage.

In an internal combustion engine according to a third aspect of the present invention, the plasma actuator according to the first or second aspect of the present invention is provided in an intake port.

In this internal combustion engine, a plurality of plasma actuators may be provided. Specifically, a plurality of plasma actuators may be provided so as to correspond to locations where separation of an airflow of an intake air is likely to occur, depending on the shape of the intake port.

According to this configuration, the flow of the gas within the intake port can be freely controlled. As a result, separation of the gas due to the shape of the intake port can be suppressed. Consequently, provision of the plasma actuator prevents a reduction in combustion efficiency. Therefore, the plasma actuator can contribute to an improvement in fuel consumption.

Effects of the Invention

A plasma actuator according to an aspect of the present invention has the configuration as described above. Accordingly, movement of a plasma, which is generated by applying a high alternating voltage or a pulse voltage, from the location of generation to another location can be suppressed by a magnetic field formed by a front surface electrode and a back surface electrode, each of which is formed of a magnetic substance. As a result, even when the plasma actuator is exposed to a high-speed airflow under high pressure, the flow of a gas can be controlled.

In the plasma actuator according to another aspect of the present invention, plasmas are generated at multiple stages. With this configuration, shock waves generated in association with the generation of the plasmas are connected to each other. This allows generation of stronger shock waves. As a result, the effectiveness for a dynamic pressure flow is increased. Therefore, it is possible to provide a plasma actuator capable of controlling a gas flow even when the plasma actuator is exposed to a high-speed airflow under high pressure.

In the internal combustion engine according to still another aspect of the present invention, the flow of a gas within an intake port can be freely controlled. Accordingly, separation of the gas due to the shape of the intake port can be suppressed. As a result, a reduction in the combustion efficiency can be prevented. Therefore, the plasma actuator can contribute to an improvement in fuel consumption.

The object, features, aspects, and advantages of the present invention will be apparent from the following detailed description and the attached drawings.

DESCRIPTION OF EMBODIMENTS

First Embodiment

Hereinafter, an embodiment of the present invention will be described with reference to the drawings.

Figure 1:
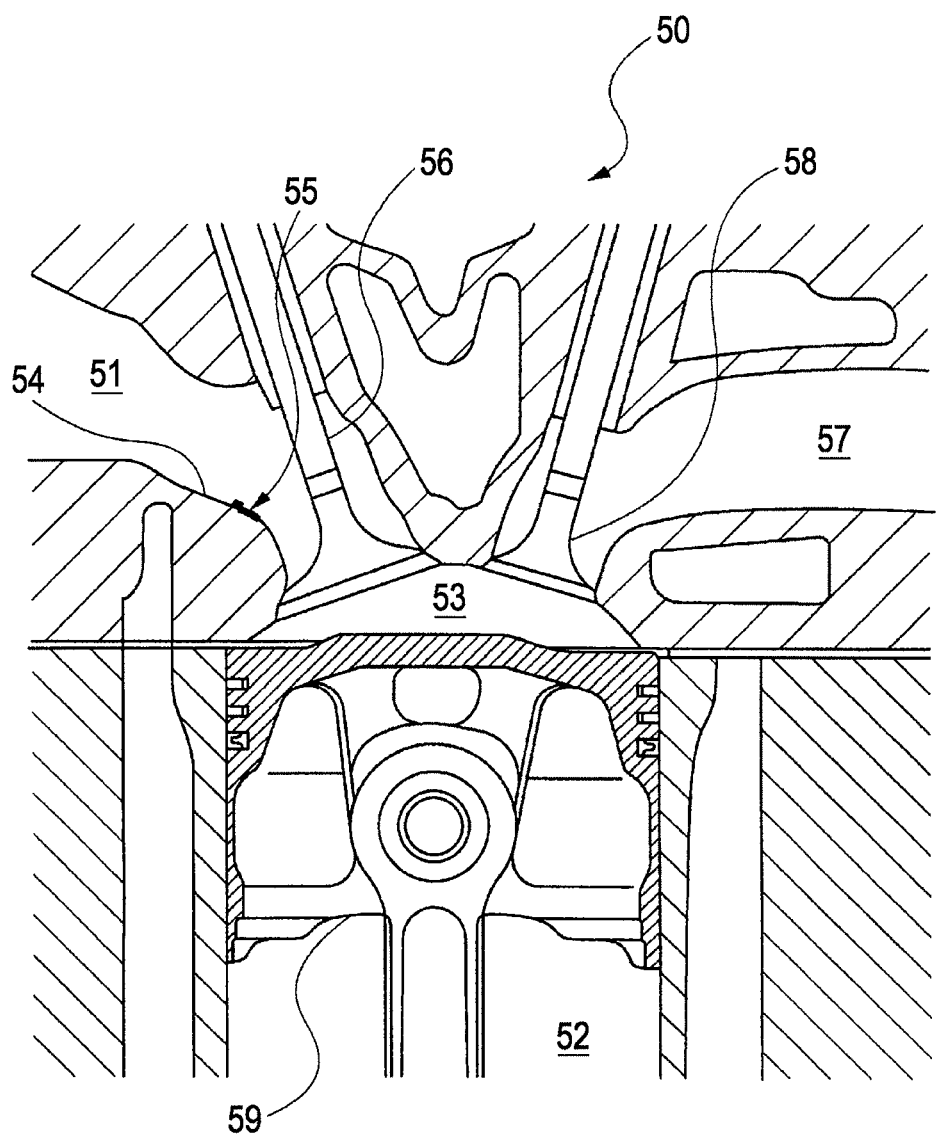
FIG. 1 is a partial sectional view of an embodiment of the present invention.

An engine 50 is an internal combustion engine of this embodiment. The engine 50 is, for example, a multicylinder engine for an automobile. The engine 50 is a spark ignition type engine using gasoline as fuel, for example. In the engine 50, an intake air and fuel are introduced into a cylinder 52 through each intake port 51 leading to an intake manifold. FIG. 1 is an enlarged view of a configuration of a substantial part of one cylinder. Each intake port 51 has a shape curved from the intake manifold side toward a combustion chamber 53. In each intake port 51, a plasma actuator 55 is provided at a location where separation of a gas is liable to occur in view of the curvature of a curved surface 54 which curves toward the inside in a convex shape. Note that in FIG. 1, reference numeral 56 denotes an intake valve; 57, an exhaust port, 58, an exhaust valve; and 59, a piston.

Figure 2:
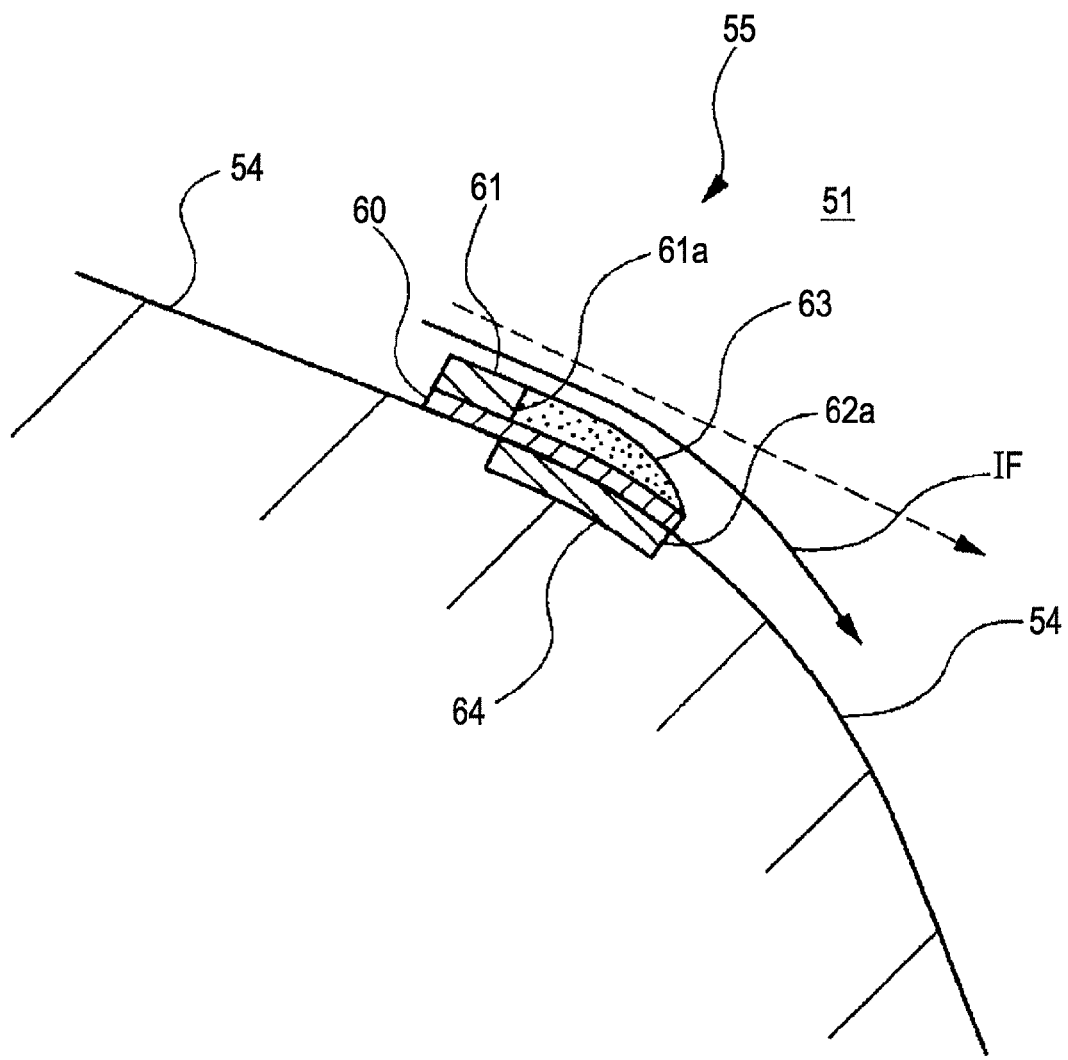
FIG. 2 is an enlarged partial sectional view of a substantial part of the embodiment.

As shown in FIG. 2, the plasma actuator 55 includes a dielectric 60, a front surface electrode 61, and a back surface electrode 62. The dielectric 60 is disposed on the curved surface 54 which is the front surface of the intake port 51. The front surface electrode 61 is disposed on the front surface of the dielectric 60 so as to be accessible to the intake air which is a gas. The back surface electrode 62 is disposed on the back surface side of the dielectric 60 so as to be arranged in a back-to-back manner with respect to the front surface electrode 61. The plasma actuator 55 is formed to have a shape in close contact with an internal wall surface of the intake port 51. Note that in FIG. 2, each of the dielectric 60, the front surface electrode 61, and the back surface electrode 62 is illustrated with an exaggerated thickness to clearly understand the configuration. In practice, the overall thickness of the plasma actuator 55 is set to such a thickness that does not disturb the airflow of the intake air.

The dielectric 60 is made of for example, ceramics such as alumina, zirconia, or silicon nitride, or polymers such as Teflon (registered trademark). The dielectric 60 has such a thickness that hardly causes resistance to the intake air. The dielectric 60 is mounted to be in close contact with the curved surface 54 of the intake port 51.

Each of the front surface electrode 61 and the back surface electrode 62 has a thin-plate shape. These are each formed of an electromagnet made of a magnetic substance. The front surface electrode 61 is provided on the front surface facing the inside of the intake port 51 of the dielectric 60. On the other hand, the back surface electrode 62 is disposed on the back side of the dielectric 60. The back surface electrode 62 is buried in a wall forming the intake port 51 in the state of being electrically isolated from the curved surface 54. When the inflow direction of the intake air is set as a reference, the back surface electrode 62 is disposed at the downstream side of the front surface electrode 61. An upstream-side edge 62a of the back surface electrode 62 and a downstream-side edge 61a of the front surface electrode 61 are disposed so as to overlap each other (in other words, substantially aligned) with the dielectric 60 interposed therebetween. That is, the relative positional relationship between the front surface electrode 61 and the back surface electrode 62 is adjusted so that an end face at the downstream side of the front surface electrode 61 is opposed to the back surface electrode 62 substantially perpendicularly through the dielectric 60. The relative positional relationship itself between the front surface electrode 61 and the back surface electrode 62 may be adjusted using a widely known technique in this technical field.

In such a configuration, when the engine 50 is driven, a high alternating voltage or a pulse voltage is applied between the front surface electrode 61 and the back surface electrode 62. This allows a plasma 63 to be generated on the surface of the dielectric 56 on the downstream side of the front surface electrode 61. Well-known voltages and frequencies in this field, for example, 1 kV to 10 kV and 1 kHz to 10 kHz, may be used as the value and frequency of the applied high alternating voltage or pulse voltage.

In the state where the high alternating voltage or the pulse voltage is applied between the front surface electrode 61 and the back surface electrode 62, the front surface electrode 61 and the back surface electrode 62, each of which is formed of an electromagnet, form an alternating magnetic field having the same phase and frequency as those of the applied high alternating voltage or pulse voltage. This alternating magnetic field is generated perpendicularly from the front surface electrode 61 and the back surface electrode 62, and covers the generated plasma 63. In this manner, when the alternating magnetic field acts on the plasma 63, ions within the plasma 63 move while spinning in a direction opposite to the direction of the magnetic field. Electrons move while spinning in the same direction as the direction of the magnetic field. As a result, the ions, electrons, radicals, and the like collide with each other in the plasma 63. This promotes the generation of the plasma 63. In addition, movement of the plasma 63 from the location of generation is suppressed by the formed alternating magnetic field, and the plasma is retained at the location.

When the engine 50 is driven, the intake air flows into the cylinder 52 through the intake port 51 in the intake process of each cylinder. At this time, the movement of the plasma 63 generated in the plasma actuator 55 is suppressed by the magnetic field. For this reason, the plasma 63 effectively acts on the flowed intake air. As a result, an induced airflow is generated by the plasma actuator 55 in a portion where the plasma actuator 55 is provided. By this induced airflow, the airflow of the intake air as indicated by a solid arrow IF in FIG. 2 is obtained. That is, separation of this airflow is suppressed. Accordingly, the intake air smoothly flows into the cylinder. This improves the charging efficiency of the intake air. This results in an improvement in fuel consumption. Note that if separation of the airflow occurs, the intake air does not flow along the curved surface 54 as indicated by a dashed arrow in FIG. 2, and is separated from the curved surface 54.

Note that in the embodiment described above, an electromagnet is employed as the magnetic substance. However, a permanent magnet may also be used as the magnetic substance.

The number of the plasma actuators 55 provided in the intake port 51 is not limited to one as in the embodiment described above. The plasma actuator 55 may be provided at every location where separation of an airflow of an intake air is likely to occur. That is, the plasma actuator 55 may be provided at a plurality of locations along the airflow direction of the intake air depending on the shape of the intake port 51.

Figure 3:
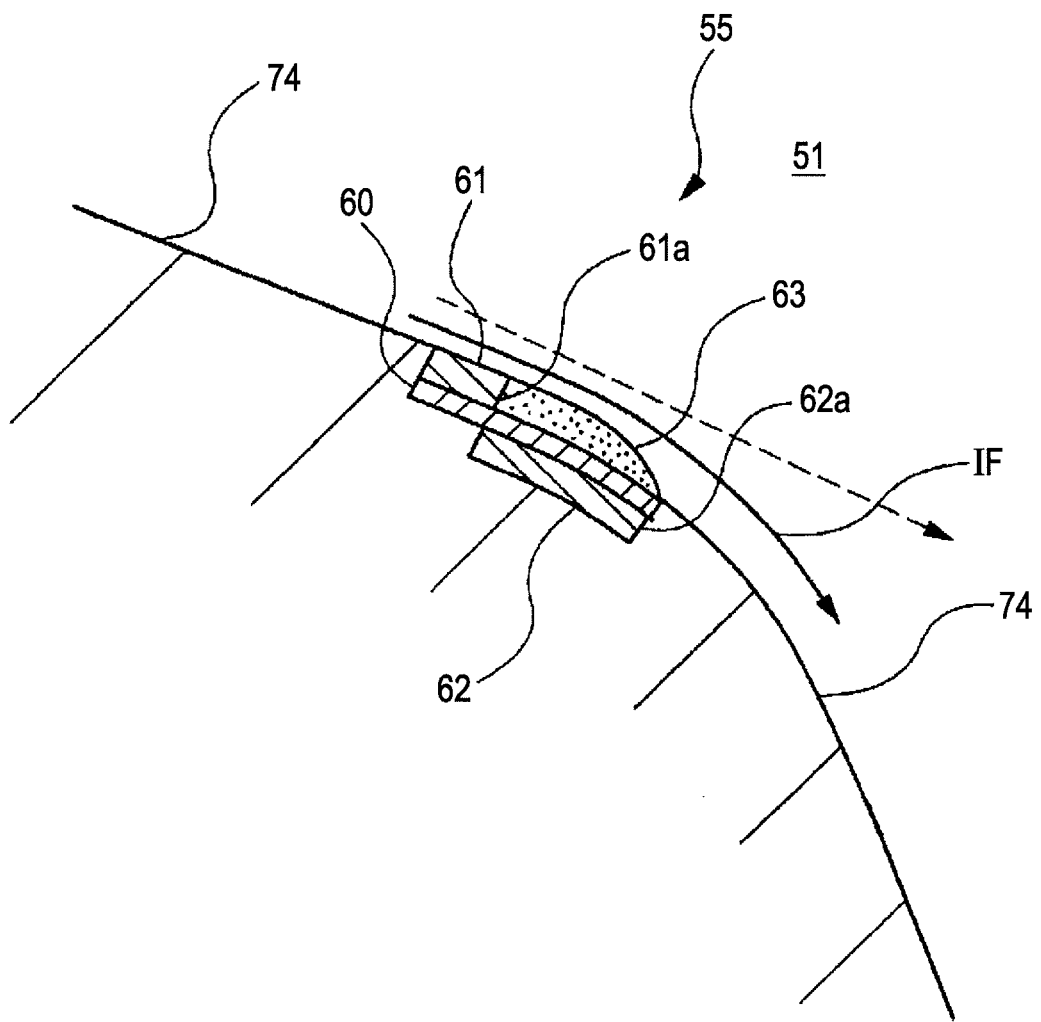
FIG. 3 is an enlarged partial sectional view of a substantial part of a modified example of the embodiment.

Furthermore, as shown in FIG. 3, the plasma actuator 55 may be provided so as to be buried in a curved surface 74. In this configuration, the surface of the front surface electrode 61 is flush with the curved surface 74 at the upstream of the intake port. Moreover, the surface of the dielectric 60 is flush with the curved surface 74 at the downstream of the intake port. In the embodiment described above, the thickness of the front surface electrode 61 forms a small step on the curved surface 54 with respect to the inflow direction of the intake air. This results in the possibility of disturbing the intake air. Accordingly, the surface of the front surface electrode 61 is set to be flush with the curved surface 74, thereby making it possible to eliminate such a small step. This allows the intake air to be smoothly guided to a portion where the plasma 63 is retained. In addition, the surface of the dielectric 60 and the curved surface 74 are continuously formed with no step. Accordingly, separation of the airflow can be suppressed with high precision.

Second Embodiment

Hereinafter, a second embodiment of the present invention will be described with reference to the drawings.

Figure 6:
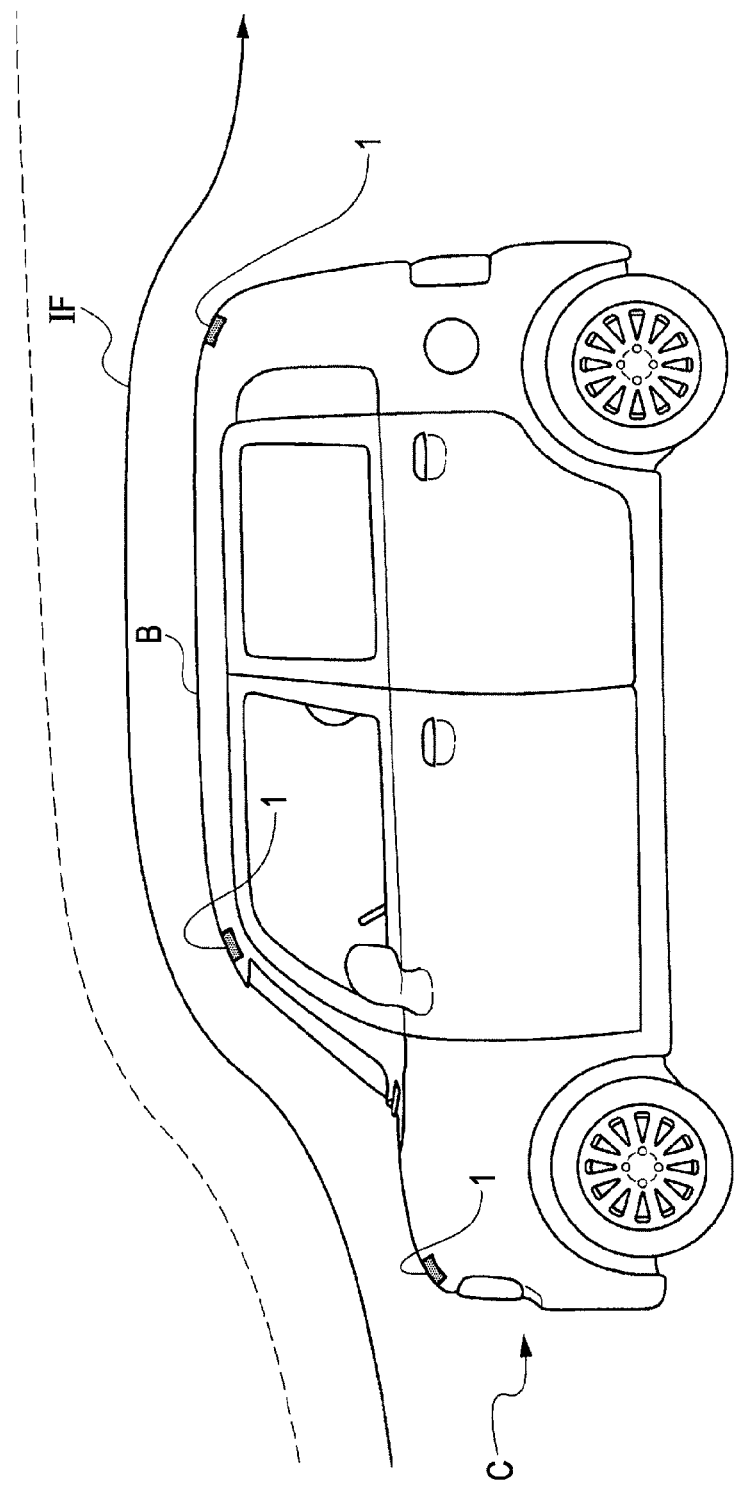
FIG. 6 is an appearance view according to a second embodiment of the present invention.

As shown in FIG. 6, a plasma actuator according to this embodiment is mounted on a body surface B of an automobile C. As shown in the figure, as a mounting example of a plasma actuator 1, the plasma actuators 1 are respectively mounted to a front end portion of a hood on the body surface B, an upper portion of a windshield, and an upper portion of a rear window in this embodiment.

Herein, the plasma actuator 1 according to this embodiment includes three or more, four in this case, electrodes 11, and two or more, three in this case, dielectrics 10. The plasma actuators 1 are disposed on the surface B side of the object. When a high voltage is applied to the electrodes 11, plasmas 15 are generated at each end 10a of each of the dielectrics 10 exposed so as to be accessible to a gas. Each of the plasma actuators 1 has features that the electrodes 11 and the dielectrics 10 are alternately stacked one on another and the ends 10a of the dielectrics 10 are disposed so as to be exposed in the normal line direction of the surface B of the object in the stacked order. In the drawings attached herewith, each of the dielectrics 10 and the electrodes 11 is illustrated with an exaggerated thickness to clearly understand the configuration.

Hereinafter, the configuration of each of the plasma actuators 1 will be described with reference to FIGS. 4 to 7.

Figure 4:
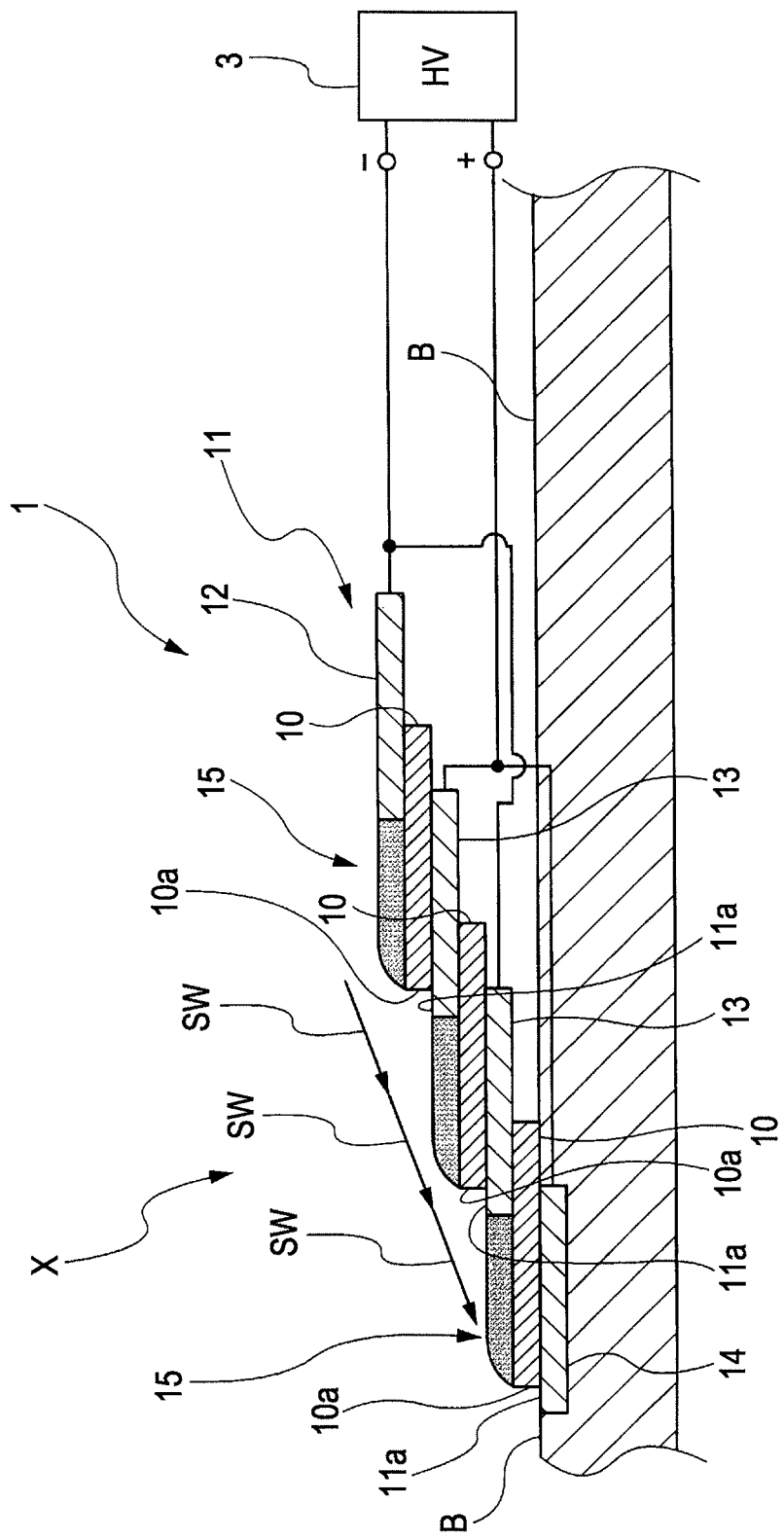
FIG. 4 is an explanatory diagram of a configuration according to the embodiment.
Figure 5:
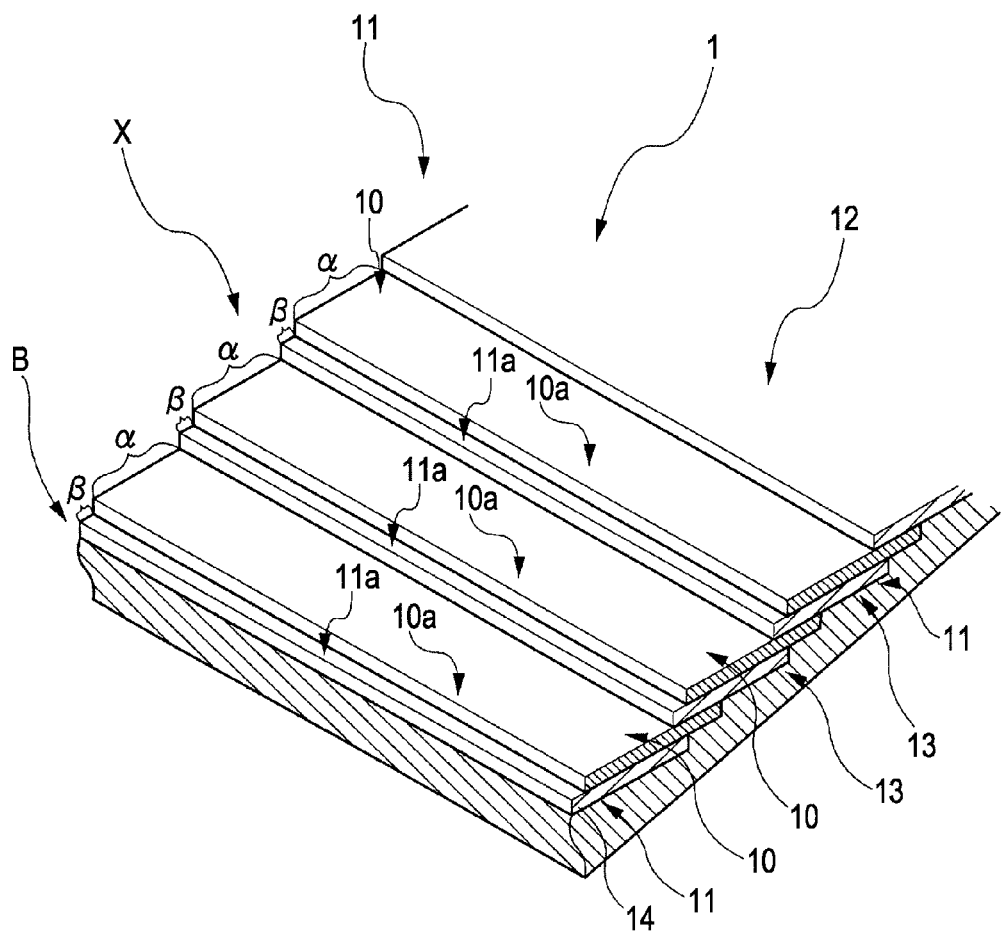
FIG. 5 is explanatory diagram of a schematic configuration according to the embodiment.

As shown in FIGS. 4 and 5, the dielectrics 10 include three thin-plate-shaped insulators in this embodiment. These dielectrics 10 are each made of a material of ceramics such as alumina, zirconia, or silicon nitride, or polymers such as Teflon (registered trademark) or polyimide, for example. Each of these dielectrics 10 has such a thickness that hardly causes resistance to the air.

As shown in FIGS. 4 and 5, the electrodes 11 are each formed in a thin plate shape. The electrodes 11 are each formed of an electromagnet, which is a magnetic substance, in this embodiment. The electrodes 11 include an upper electrode 12 located at an uppermost portion, a lower electrode 14 located at a lowermost portion, and two intermediate electrodes 13 which are interposed between the upper electrode 12 and the lower electrode 14. These electrodes 11 are disposed in the state of being electrically isolated from the surface B. When the airflow direction is set as a reference, the upper electrode 12, the intermediate electrodes 13, and the lower electrode 14 are disposed in this order from the upstream side to the downstream side. Particularly, in this embodiment, as schematically shown in FIG. 6, the upper electrode 12, which is an electrode disposed on the uppermost side, is set to a negative polarity so as to generate a plasma more efficiently. The electrodes 11 are disposed such that at least a part of one of a pair of electrodes 11 disposed through any of the dielectrics 10 overlaps in plan view with the other of the pair of electrodes 11. The electrodes 11 are each connected to a high voltage generator (HV) 3. The high voltage generator 3 itself is conventionally known. Accordingly, a detailed description of the configuration thereof is omitted.

As described above, in the plasma actuator according to this embodiment, the electrodes 11 and the dielectrics 10 are alternately stacked one on another. Furthermore, the electrodes 11 and the dielectrics 10 are disposed such that the ends 10a of the dielectrics 10 are exposed in the normal line direction of the surface B in the stacked order. That is, a stepped exposed portion X is formed.

In the stepped exposed portion X, the ends 10a of the dielectrics 10 and ends 11a of the electrodes 11 are exposed in the normal line direction of the surface B in the stacked order. Specifically, in this stepped exposed portion X, the ends a of the electrodes 11 and the ends 10a of the dielectrics 10 are disposed so as to be continuously exposed in the oblique direction from the plane direction of the electrodes 11 and the dielectrics 10 with respect to the surface B which is the object surface. In this embodiment, a dimension α of an exposed portion of each end 10a of each dielectric 10 is set to be greater than a dimension β of an exposed portion of each end 11a of each electrode 11 between the dielectrics 10.

Figure 7:
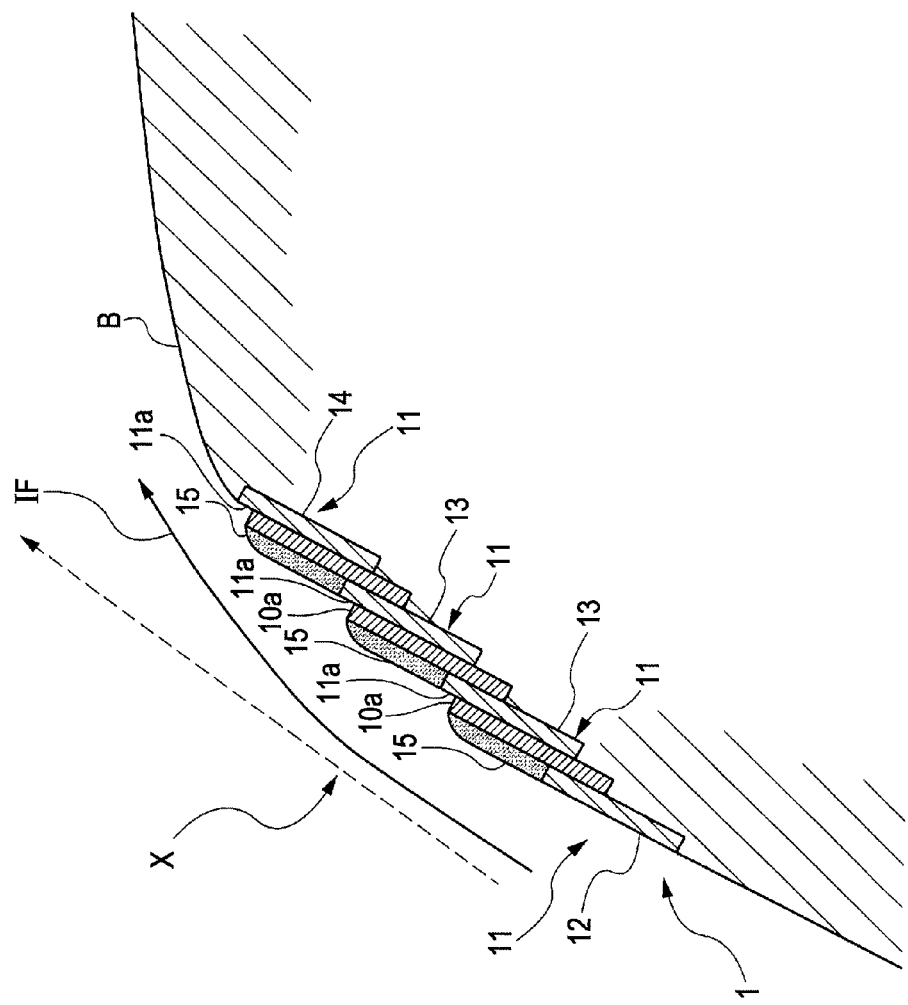
FIG. 7 is a partially enlarged sectional view of the second embodiment.

In such a configuration, when the automobile C as shown in FIG. 6 is allowed to travel in this embodiment, the high voltage generator 3 applies a high pulse voltage between the electrodes 11. As a result, as shown in FIGS. 4 and 7, the plasmas 15 are generated on the surface of each dielectric 10 at the downstream side of the electrodes 11. The high pulse voltage to be applied may have a voltage value and a frequency (for example, 1 kHz to 10 kHz and 1 kV to 10 kV) which are known in this field, or may have a voltage value and a frequency which vary depending on the flow rate. As a matter of course, instead of the mode shown in FIG. 4, a high alternating voltage having a similar voltage value and frequency may be applied.

When the above-mentioned voltage is applied to the electrodes 11, the plasmas 15 are generated at multiple stages. Shock waves SW are respectively generated at the locations where the plasmas 15 are generated at multiple stages. In this embodiment, the stepped exposed portion X is formed such that the locations where the plasmas are generated are obliquely arranged. Thus, the generated shock waves SW are connected to each other in the oblique direction. This enables generation of stronger shock waves SW. As a result, also a gas having a high pressure and a high flow rate can be reliably controlled Further, in the state where a voltage is applied to the electrodes 11, the electrodes 11, each of which is formed of an electromagnet, form a pulsing magnetic field having the same frequency as that of the applied high pulse voltage. The pulsing magnetic field is generated perpendicularly from the electrodes 11, and covers the generated plasmas 15. Thus, when the pulsing magnetic field acts on the plasmas 15, ions within the plasmas 15 move while spinning in the direction opposite to the direction of the magnetic field. Electrons move while spinning in the same direction as the direction of the magnetic field. As a result, the ions, electrons, radicals, and the like collide with each other in the plasmas 15. Consequently, the generation of the plasma 15 is promoted. Furthermore, movement of the plasmas 15 from the location of generation is suppressed by the formed pulsing magnetic field, and is retained at the location. Note that when an alternating voltage is applied, instead of the pulse voltage, to the electrodes 11, not the above-mentioned pulsing magnetic field but an alternating magnetic field is formed.

When the automobile C as shown in FIG. 6 is allowed to travel in the state where the above-mentioned voltage is applied to the plasma actuators 1, the body surface B of the automobile C receives a wind pressure from the front side. At this time, in the plasma actuators 1, the movement of the plasmas 15 generated at multiple stages is suppressed by the magnetic field, and the plasmas 15 cause the strong shock waves SW as described above. Accordingly, the plasmas effectively act on the air flowing from the front side. As a result, in the respective portions where the plasma actuators 1 are provided, an inducted airflow is generated by the plasma actuators 1. By this induced airflow, the flow of air (that is, an airflow) as indicated by the solid line arrow IF in FIG. 4 is obtained. That is, separation of the airflow is suppressed. Therefore, the air resistance received by the body of the automobile C is effectively reduced. If no voltage is applied to the plasma actuators 1, separation of the airflow occurs. In this case, the air does not flow along the surface B as indicated by the dotted arrow in FIG. 6. That is, the separation occurs.

In the plasma actuators 1 according to this embodiment having the configuration as described above, the plasmas 15 are generated at multiple stages by application of a pulse voltage. For this reason, the shock waves SW, which are generated in association with the generation of the plasma 15, are generated at multiple stages. Accordingly, the generated shock waves SW are connected to each other. In comparison with the prior art using a single dielectric 10, the stronger shock waves SW can be generated even in the case where the same voltage is applied. Therefore, even when the plasma actuators are exposed to a high-speed airflow under high pressure, the gas flow can be controlled more favorably than in the conventional case. This leads to an effective reduction in air resistance applied to the automobile C during traveling. As a result, the fuel consumption of the automobile C can be improved. Moreover, wind noise generated during traveling of the automobile C can be effectively reduced.

In order words, the plasma actuators 1 according to this embodiment enable generation of the stronger shock waves SW even at the same voltage, as compared with the conventional case. Accordingly, electric power necessary to obtain the effect of improving the flow at a desired strength can also be effectively reduced.

In the stepped exposed portion X of each plasma actuator 1 according to this embodiment, the ends 10a of the dielectrics 10 and the ends 11a of the electrodes 11 are exposed to to be directed in the normal line direction of the surface B in the stacked order in order to more reliably control the airflow. Furthermore, the dimension α of the exposed portion of each end 10a of each dielectric 10, the end 10a being a location where each plasma 15 is generated, is set to be greater than the dimension 13 of the exposed portion of each end 11a of each electrode 11.

Third Embodiment

Hereinafter, a third embodiment of the present invention will be described in detail. Note that in this embodiment and each modified example described later, the components corresponding to those of the second embodiment are denoted with the same reference numerals, and the detailed description thereof is omitted.

Figure 8:
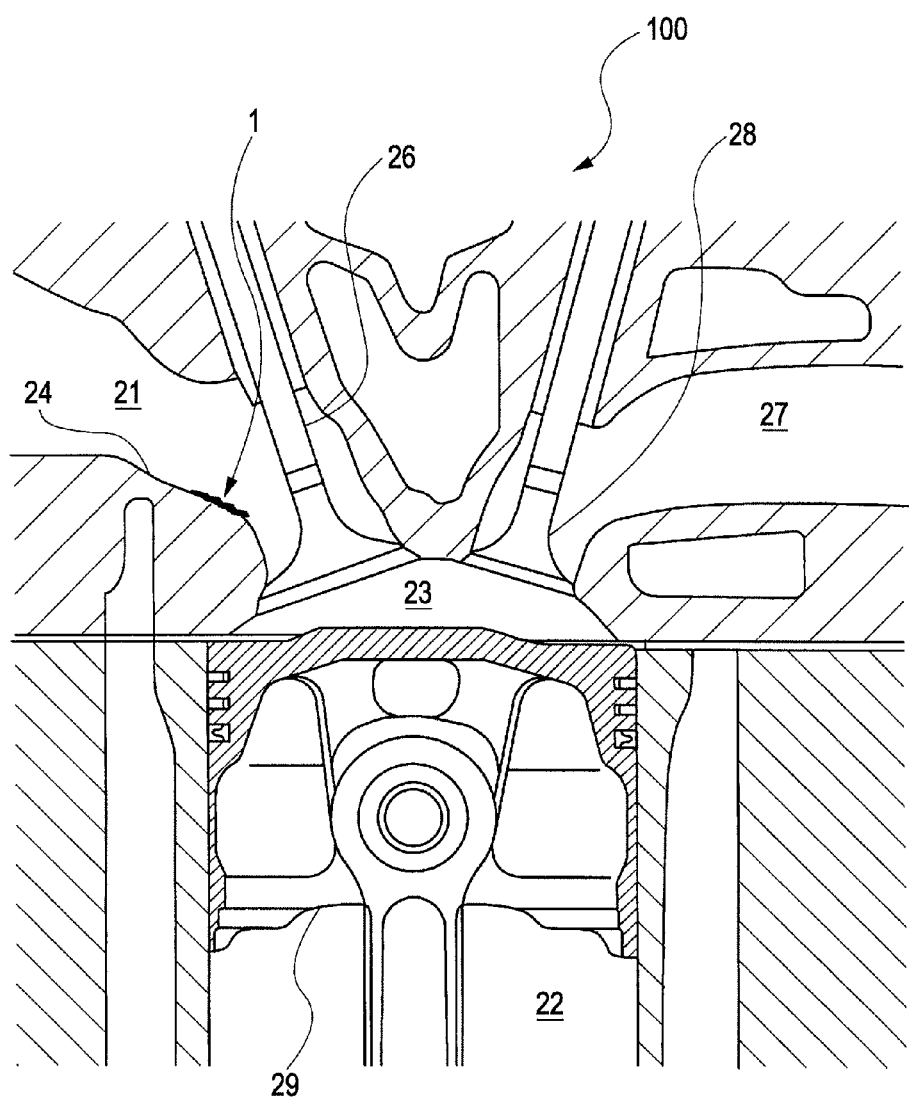
FIG. 8 is a partial sectional view according to a third embodiment of the present invention.

The plasma actuator 1 according to this embodiment is applied to a multicylinder engine 100, which is an internal combustion engine, for an automobile. This engine 100 is, for example, a spark ignition type engine using gasoline as a fuel. In the engine 100, an intake air and fuel are introduced into a cylinder 22 through an intake port 21 leading to an intake manifold. FIG. 7 is an enlarged view of the configuration of a substantial part of one cylinder. Each intake port 21 has a shape curved from the intake manifold side toward a combustion chamber 23. In each intake port 21, the plasma actuator 1 is provided at a location where separation of a gas is liable to occur in view of a curvature of a curved surface 24 which curves toward the inside in a convex shape. Note that in FIG. 8, reference numeral 26 denotes an intake valve; 27, an exhaust port; 28, an exhaust valve; and 29, a piston.

Figure 9:
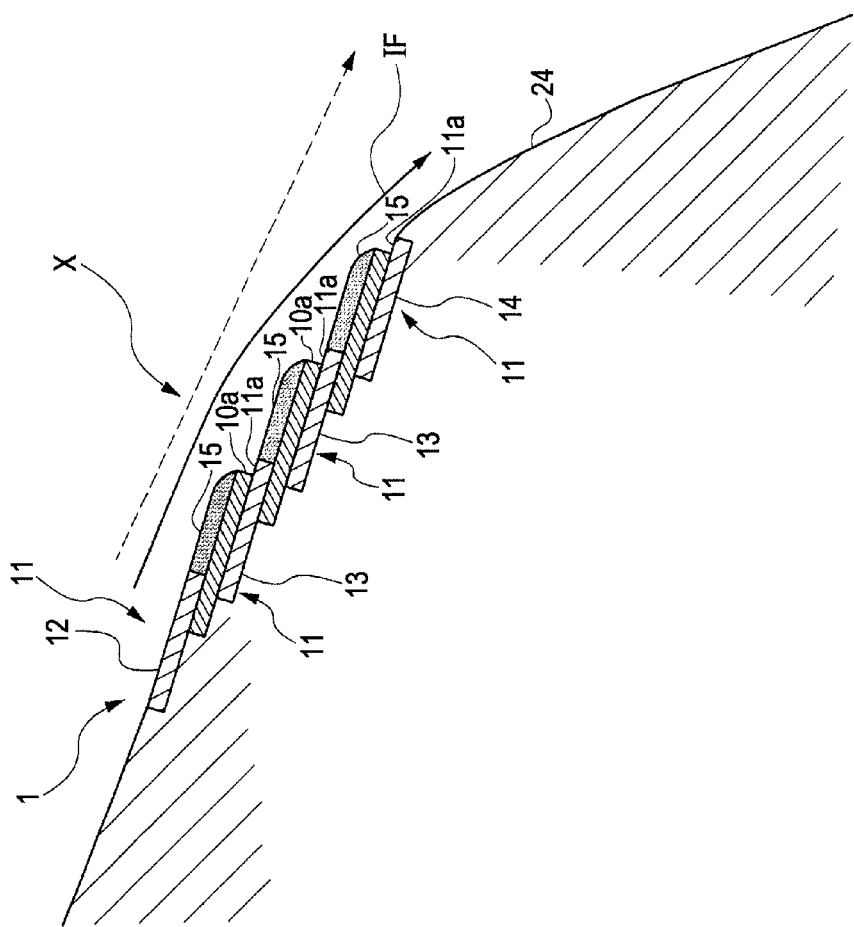
FIG. 9 is a partially enlarged sectional view of the third embodiment.

Note that in FIG. 9, each of the dielectrics 10 and the electrodes 11 is illustrated with an exaggerated thickness to clearly understand the configuration. In practice, the overall thickness of the plasma actuator 1 is set to such a thickness that does not disturb the airflow of the intake air.

When the engine 100 is driven, the intake air is flowed into the cylinder 22 through the intake port 21 in the intake process of each cylinder. At this time, the plasmas 15 generated in the plasma actuator 1 effectively act on the flowed intake air, as in the embodiment described above. As a result, an induced airflow is generated by the plasma actuator 1 at a portion where the plasma actuator 1 is provided. By this induced airflow, the airflow of the intake air as indicated by the solid arrow IF in FIG. 9 is obtained. That is, separation of the airflow is suppressed. Accordingly, the intake air smoothly flows into the cylinder 22. For this reason, the charging efficiency of the intake air is improved, thereby making it possible to improve the fuel consumption. Note that if separation of the airflow occurs, the intake air does not flow along the curved surface 24 as indicated by the dashed arrow in FIG. 9, and is separated from the curved surface 24.

The number of the plasma actuators 1 provided in the intake port 21 is not limited to one as in the embodiment described above. The plasma actuator 1 may be provided at every location where separation of the airflow of the intake air is likely to occur. That is, the plasma actuator 1 may be provided at a plurality of portions along the direction of the airflow of the intake air depending on the shape of the intake port 1.

Figure 10:
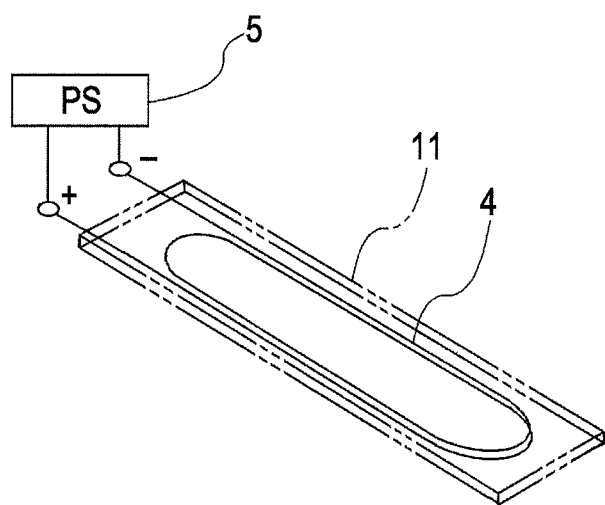
FIG. 10 is a schematic perspective view showing an example of an electrode formed as an electromagnet according to an embodiment of the present invention.

Herein, a configuration example of each electrode 11 formed of an electromagnet will be described. FIG. 10 is a schematic perspective view showing an example of each electrode 11 formed as an electromagnet. In the example of FIG. 10, the electrode 11 is formed by covering a coil 4, which is formed of a copper line subjected to insulating coating, with aluminum or copper. One electrode of the high voltage generator (HV) 3 is connected to a metal, such as copper, which covers the coil 4. The electrode 11 may be formed only of the coil 4 without providing the metal that covers the coil 4. In this case, the coil 4 is connected to one electrode of the high voltage generator 3. A magnetic field generated by the coil 4 can be strengthened by increasing the number of turns of the coil 4 or by increasing a current caused to flow through the coil 4. To strengthen the magnetic field, a core made of a ferromagnetic material such as an iron core, which is surrounded by the coil 4, may be added. The coil 4 is connected with a power supply (PS) 5 for supplying electric power to the coil 4. The power supply 5 is synchronized with the high voltage generator 3, for example, and causes a current having the same frequency as that of the voltage output from the high voltage generator 3 to flow through the coil 4.

Modified Example

Figure 11:
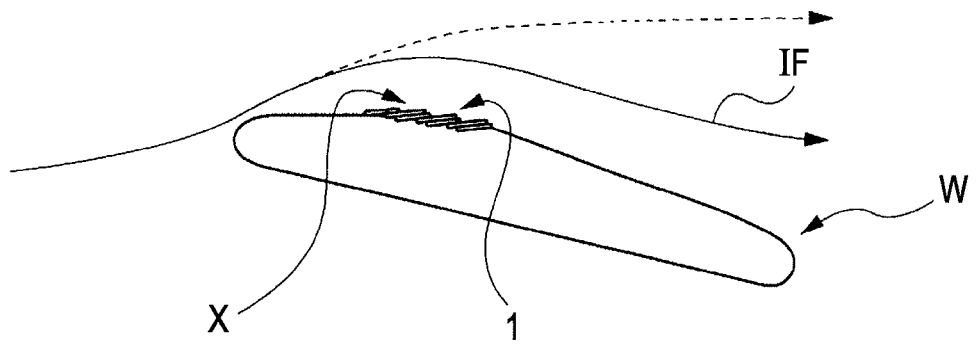
FIG. 11 is an appearance view according to a modified example of the present invention.

For example, as shown in FIG. 11, the plasma actuator 1 (or 55) similar to the embodiment described above may be applied to a wing W of an aircraft. In this case, as illustrated in the drawings, an induced airflow is generated by the plasma actuator 1 as in each of the embodiments described above. By this induced airflow, the airflow of the intake air as indicated by the solid line arrow IF in FIG. 11 is obtained. That is, the separation of the airflow is suppressed.

Figure 12:
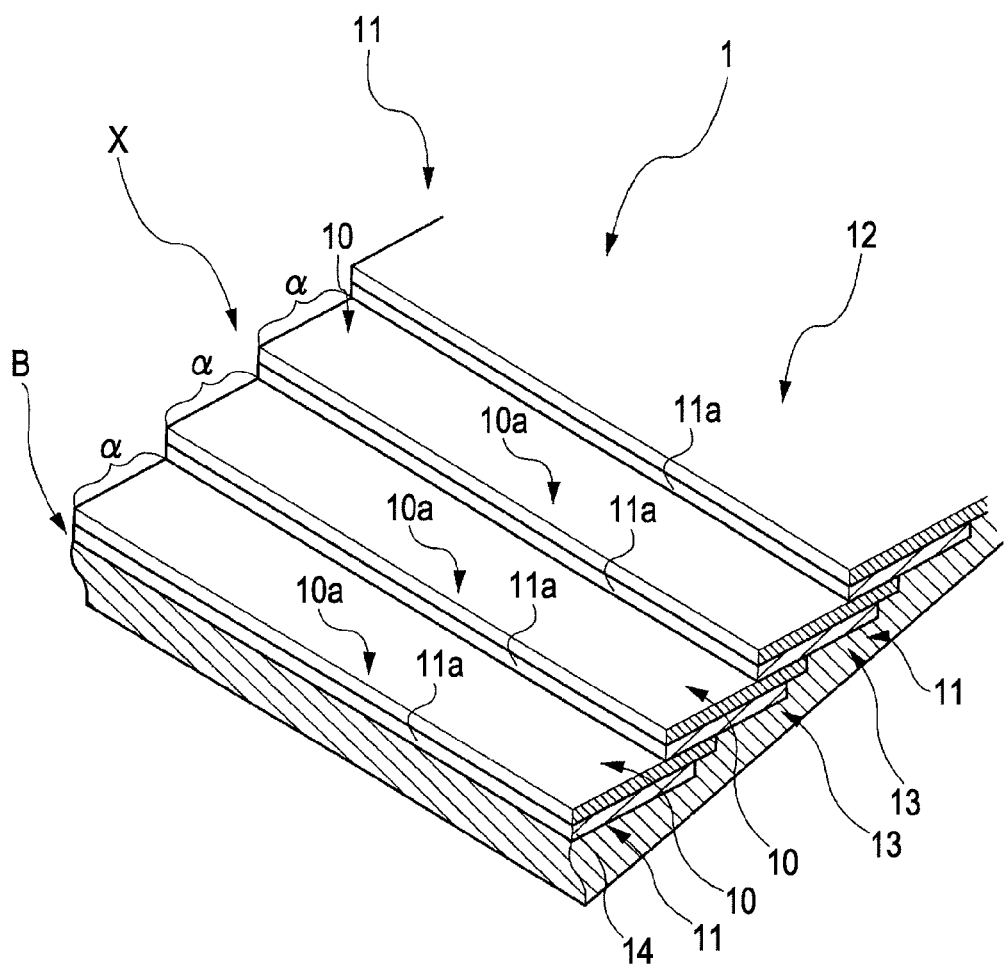
FIG. 12 is a partially enlarged sectional view according to another modified example of the present invention.

Further, as shown in FIG. 12, the ends 11a at the downstream side of the electrodes 11 and the ends 10a at the downstream side of the dielectrics 10 may be aligned at the same position in plan view. Furthermore, only the dielectrics 10 may be exposed along the normal line direction of the surface B of the object. Also in such a configuration, the plasmas 15 are generated at multiple stages. Consequently, the same functions and effects as those of each of the embodiments and modified example described above can be obtained.

The modified example is not limited to the above example. For example, in the above-mentioned embodiments, an electromagnet is employed as the magnetic substance. However, a permanent magnet may also be used as the magnetic substance. Further, specific modes such as materials and specific dimensions of the dielectrics and electrodes are not limited to those of the embodiments described above. These specific modes include existing modes as well as various modes.

This international application is based upon and claims the benefit of priority from Japanese Patent Application No. 2009-196044, filed on Aug. 26, 2009, and Japanese Patent Application No. 2010-002356, filed on Jan. 7, 2010, the disclosure of both of which is incorporated herein in its entirety by reference.

The description of specific embodiments of the present invention is for illustrative purposes only. The embodiments herein disclosed are not intended to be exhaustive or limit the present invention. It is obvious to those skilled in the art that various modifications and variations can be made in light of the above teachings.

INDUSTRIAL APPLICABILITY

A plasma actuator according to the present invention is applicable to portions where an aerodynamic resistance occurs, such as various internal combustion engines including an intake port (e.g., a spark ignition type engine or a diesel engine), wings of an aircraft, and an exterior of an automobile. Application examples of the internal combustion engines according to the present invention include an automobile.

DESCRIPTION OF REFERENCE SIGNS

1 ... PLASMA ACTUATOR
10 ... DIELECTRIC
11 ... ELECTRODE
15 ... PLASMA
51 ... INTAKE PORT
55 ... PLASMA ACTUATOR
60 ... DIELECTRIC
61 ... FRONT SURFACE ELECTRODE
62 ... BACK SURFACE ELECTRODE
63 ... PLASMA
X ... STEPPED EXPOSED PORTION

The invention claimed is:
1. A plasma actuator comprising:
at least three electrodes; and
at least two dielectrics, the number of dielectrics of which is smaller than that of the number of electrodes by one,
the plasma actuator being disposed on a surface of an object to generate a plasma at an end of each of the dielectrics exposed so as to be accessible to a gas, by application of a high voltage to each of the electrodes,
wherein the electrodes and the dielectrics are alternately stacked one on another, and the electrodes and the dielectrics are disposed such that ends of the dielectrics are exposed in a stepwise manner in a normal line direction of the object surface in a stacked order.

2. The plasma actuator according to claim 1, wherein
the ends of the electrodes and the ends of the dielectrics are exposed in a stepwise manner in the normal line direction of the object surface in the stacked order, and
a dimension of an exposed portion of each end of the dielectrics, is set to be greater than a dimension of an exposed portion of each end of the electrodes disposed between the dielectrics.

3. An internal combustion engine comprising the plasma actuator according to claim 1, wherein the plasma actuator is disposed in an intake port leading to an intake manifold through which a fluid is introduced into a cylinder of the engine.

4. An internal combustion engine comprising the plasma actuator according to claim 2, wherein the plasma actuator is disposed in an intake port leading to an intake manifold through which a fluid is introduced into a cylinder of the engine.

5. The plasma actuator according to claim 1, wherein unexposed ends of the electrodes and the dielectrics are disposed in the stepwise manner such that the unexposed ends of the dielectrics extend beyond the unexposed ends of the electrodes.

6. An internal combustion engine comprising the plasma actuator according to claim 5, wherein the plasma actuator is disposed in an intake port leading to an intake manifold through which a fluid is introduced into a cylinder of the engine.

* * * * *